United States Patent
Cetintas et al.

(10) Patent No.: US 10,515,127 B2
(45) Date of Patent: Dec. 24, 2019

(54) INDUCTIVE MATRIX COMPLETION AND GRAPH PROXIMITY FOR CONTENT ITEM RECOMMENDATION

(71) Applicant: Oath Inc., New York, NY (US)

(72) Inventors: Suleyman Cetintas, Santa Clara, CA (US); Kuang-chih Lee, Union City, CA (US)

(73) Assignee: Oath Inc., New York, NY (US)

( * ) Notice: Subject to any disclaimer, the term of this patent is extended or adjusted under 35 U.S.C. 154(b) by 538 days.

(21) Appl. No.: 14/682,603

(22) Filed: Apr. 9, 2015

(65) Prior Publication Data

US 2016/0299992 A1 Oct. 13, 2016

(51) Int. Cl.
*G06F 16/951* (2019.01)
*G06F 16/33* (2019.01)

(52) U.S. Cl.
CPC ........ *G06F 16/951* (2019.01); *G06F 16/3331* (2019.01)

(58) Field of Classification Search
None
See application file for complete search history.

(56) References Cited

U.S. PATENT DOCUMENTS

| | | | |
|---|---|---|---|
| 8,015,192 B2 * | 9/2011 | Rathod | G06F 17/30038 707/748 |
| 8,073,794 B2 | 12/2011 | Amer-yahia et al. | |
| 8,095,432 B1 | 1/2012 | Berman et al. | |
| 8,606,792 B1 * | 12/2013 | Jackson | 707/748 |
| 2012/0030159 A1 * | 2/2012 | Pilaszy | G06Q 10/00 706/46 |
| 2012/0102113 A1 | 4/2012 | Chartier et al. | |
| 2013/0031173 A1 | 1/2013 | Deng | |
| 2013/0036121 A1 | 2/2013 | Kim et al. | |
| 2013/0073983 A1 * | 3/2013 | Rasmussen | G06Q 30/02 715/753 |
| 2013/0124437 A1 * | 5/2013 | Pennacchiotti | G06Q 30/0255 706/12 |

(Continued)

OTHER PUBLICATIONS

Prateek Jain, Inderjit S. Dhillon, "Provable Inductive Matrix Completion", Jun. 4, 2013, https://arxiv.org/abs/1306.0626 (accessed Jun. 19, 2017).*

*Primary Examiner* — Mark D Featherstone
*Assistant Examiner* — Ranjit P Doraiswamy
(74) *Attorney, Agent, or Firm* — Cooper Legal Group, LLC

(57) ABSTRACT

Users may consume and/or share information through various types of content items. For example, user may post a family photo through a social network, create a running blog through a microblogging service, etc. Because users may be overwhelmed by the amount of available content items, it may be advantageous to recommend content items, such as blogs to follow, to users. Accordingly, inductive matrix completion is used to evaluate user interactions with content items (e.g., a user following a blog), content item features (e.g., text and/or images of a blog is evaluated to identify a topic of the blog), and/or user features (e.g., a user liking or reblogging a blog, user demographics, user interests, etc.) to determine whether to recommend a content item to a user. Additionally, graph proximity is used to recommend content items based upon weights of edges connecting user nodes to content item nodes within a directed graph.

20 Claims, 8 Drawing Sheets

(56) References Cited

U.S. PATENT DOCUMENTS

| | | | |
|---|---|---|---|
| 2013/0204825 A1* | 8/2013 | Su | G06N 5/04 |
| | | | 706/46 |
| 2014/0081965 A1 | 3/2014 | Gross | |
| 2014/0156579 A1* | 6/2014 | Bouchard | G06F 17/16 |
| | | | 706/46 |
| 2014/0376819 A1* | 12/2014 | Liu | G06K 9/3233 |
| | | | 382/205 |
| 2015/0254513 A1* | 9/2015 | Mansour | G06K 9/00744 |
| | | | 382/190 |
| 2015/0370331 A1* | 12/2015 | Gonzales, Jr. | G06F 3/013 |
| | | | 345/156 |
| 2016/0171036 A1* | 6/2016 | Kim | G06F 17/30522 |
| | | | 707/743 |
| 2016/0328409 A1* | 11/2016 | Ogle | G06F 17/30053 |
| 2017/0161639 A1* | 6/2017 | Zeng | G06F 17/16 |

* cited by examiner

INDUCTIVE MATRIX COMPLETION AND GRAPH PROXIMITY FOR CONTENT ITEM RECOMMENDATION

BACKGROUND

Many users may utilize applications, websites, videogame consoles, televisions, mobile apps, and/or other interfaces to consume content items from content provider. In an example, a video streaming service may provide users with access to movies, televisions shows, and/or other content. In another example, a social network app may provide users with access to view, create, and interact with social network posts, photos, events, and/or other social network data of social network users. Because many content providers may provide such a large amount of content items, users may be unable to efficiently identify relevant and/or interest content items. For example, a blogging website may host hundreds of thousands of blogs regarding various topics such as cars, home renovations, politics, etc., and thus a user may waste a significant amount of time trying to identify interesting blogs.

SUMMARY

In accordance with the present disclosure, one or more systems and/or methods for recommending a content item to a user are provided. In an example of recommending a content item, a user to item interaction matrix, indicating whether users have interacted with content items, may be generated (e.g., the user to item interaction matrix may correspond to a follower graph indicating whether users have followed blogs). A content item description matrix may be generated for a content item (e.g., and/or other content items). The content item description matrix may be populated with one or more content item features about the content item (e.g., a race car feature identified from text used to tag a blog content item; a red formula one car feature identified from an image of the blog content item; and/or other visual and/or textual features). A user description matrix may be generated for a user (e.g., and/or other users). The user description matrix may be populated with one or more user features about the user (e.g., a demographic features such as age, gender, and location; an interest in cars derived from social network posts of the user; an interest in soccer derived from the user reblogging and/or liking soccer related content items; etc.). The user to item interaction matrix, the content item description matrix, and/or the user description matrix may be evaluated to determine whether to recommend the content item to the user.

In an example, inductive matrix completion may be performed to jointly factorize the matrixes to determine whether to recommend the content item to the user. In another example, feature vectors may be generated based upon different feature sources (e.g., image based features, textual based features, user activity features such as reblogging and/or liking content items, etc.), and inductive matrix completion may be performed on individual feature vectors to determine whether to recommend the content item to the user. In another example, matrix completion factorization may be performed on the user to item interaction matrix to obtain a residual matrix, and inductive matrix completion may be performed to factorize the residual matrix, the content item description matrix, and the user description matrix to determine whether to recommend the content item to the user.

In another example of recommending a content item, a directed graph comprising user nodes representing users and content item nodes representing content items may be generated. Weights may be assigned to edges connecting user nodes and content item nodes based upon user interactions with content items, user features of users, and/or content item features of content items. Responsive to a weight, of an edge connecting a user node to a content item node, exceeding a recommendation threshold, a content item, represented by the content item node, may be recommended to a user represented by the user node.

In this way, content items, such as blogs, may be recommended to users that may have an interest in such content items. Because user features (e.g., demographic information and user interests of users) and/or content features (e.g., textual features and/or image features indicative of topics of content items) are used for determining whether to recommend content items, content item recommendations may be relatively accurate for new content items and/or new users that may otherwise have inadequate user to item interaction information (e.g., a new blog may have a small number of users following the new blog). In this way, providing relatively accurate content item recommendations may aid users in efficiently identifying interesting and/or relevant content.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
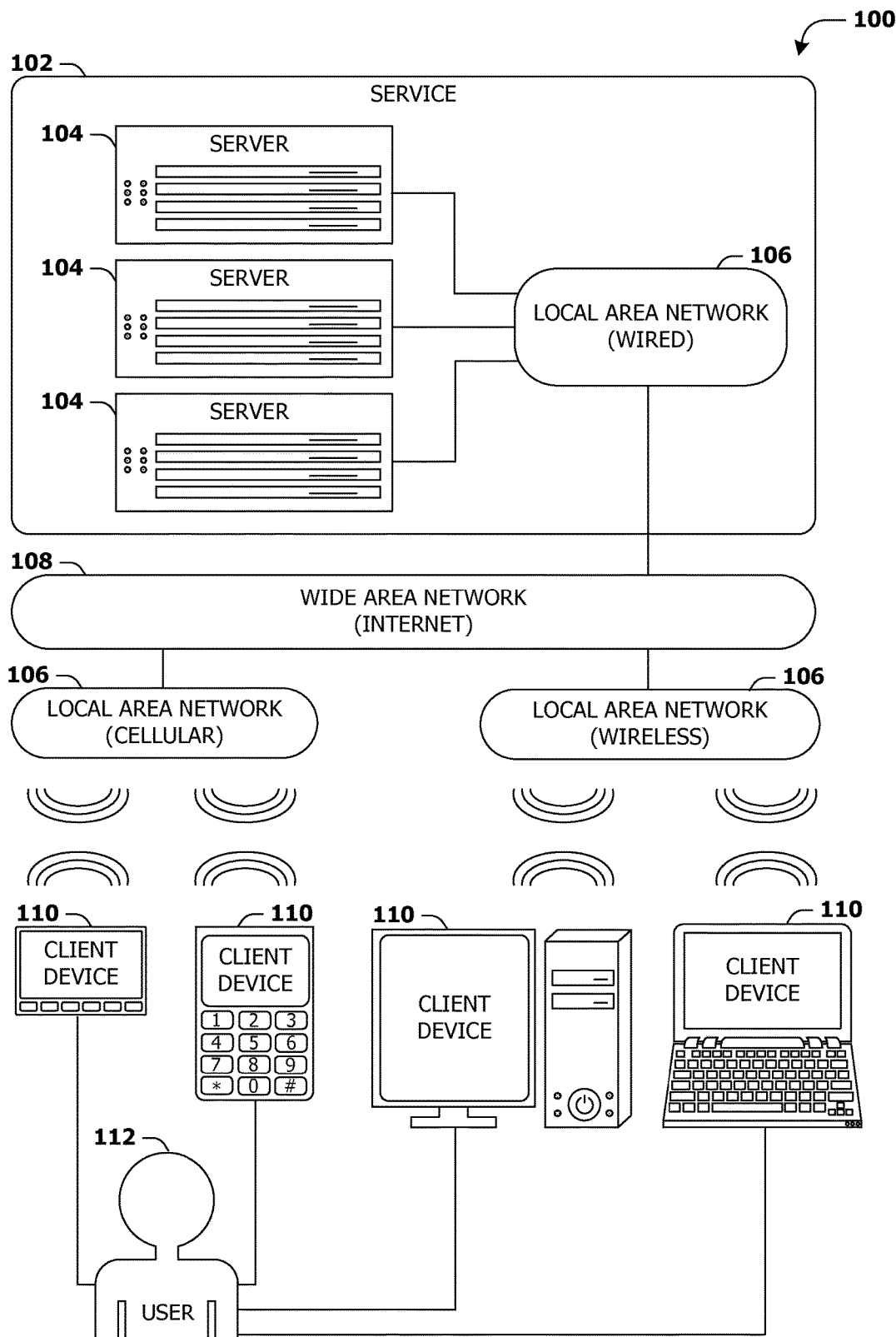
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fibre Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi network or a Bluetooth personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
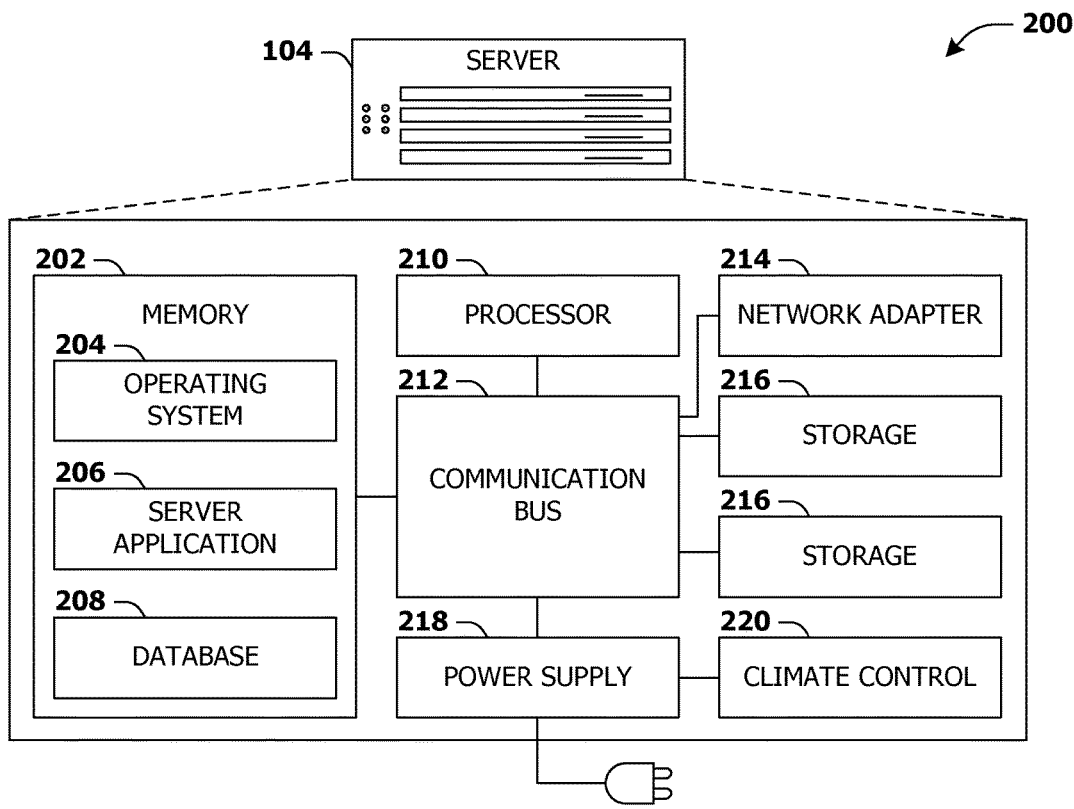
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
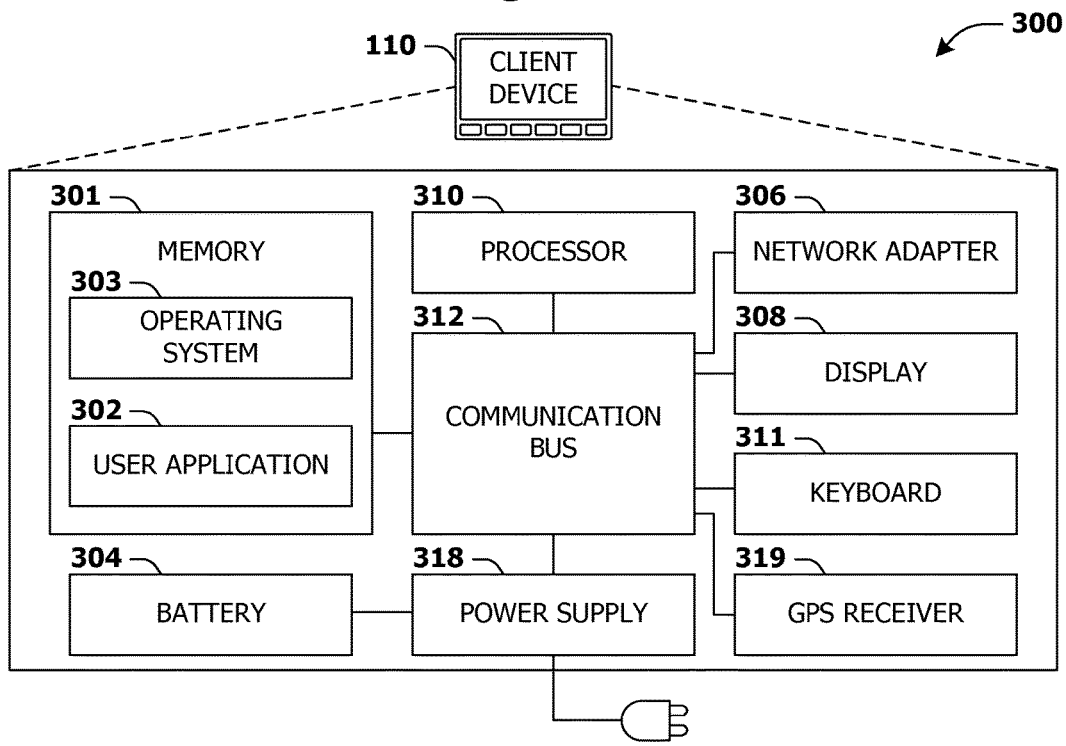
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, a cellphone or smartphone, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more systems and/or techniques for recommending content items to users are provided. Many content providers may provide users with access to an overwhelming amount of content items, such that a user may be unable to locate relevant and/or interesting content items or may overlook such content items. Thus, it may be advantageous to predict what content items may be interesting to users so that content item recommendations may be provided to users, which may enhance user experience and engagement with content items. Unfortunately, identifying content items to recommend to users may be computationally expensive and/or may be inaccurate due to sparse data, such as the use of merely user to item interaction data (e.g., what users follow a blog, what blogs a user follows, etc.) for new users and/or new content items. Accordingly, as provided herein, various inductive matrix completion techniques and/or graph proximity techniques may be used to improve recommendations by utilizing user features of users and/or item features of content items. In this way, users may efficiently locate relevant content items based upon such recommendations.

Figure 4:
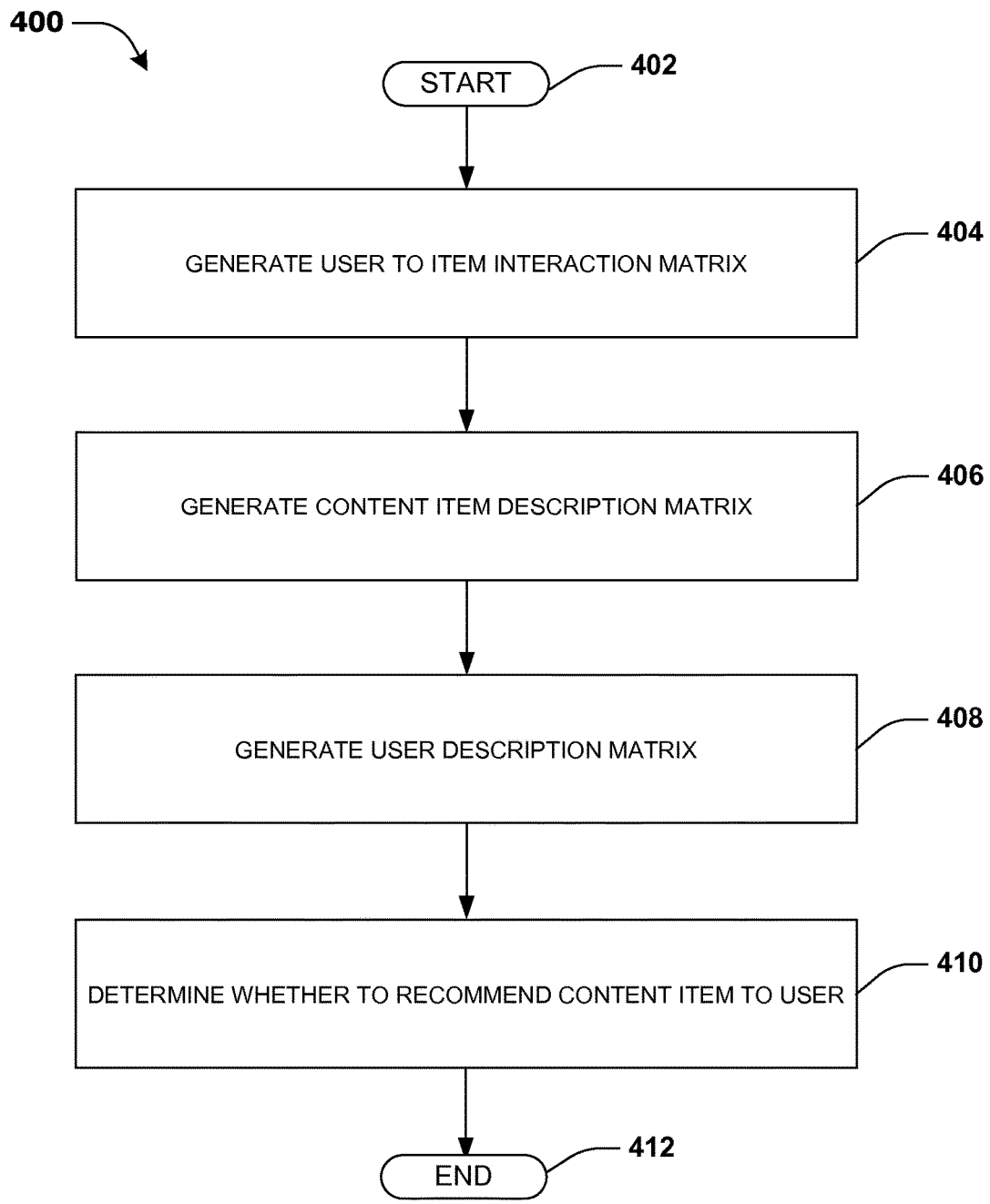
FIG. 4 is a flow chart illustrating an example method of recommending a content item to a user.

An embodiment of recommending a content item to a user is illustrated by an example method 400 of FIG. 4. At 402, the method 400 starts. A content provider may provide users with access to content items (e.g., movies, music, blogs, social network profiles, consumer goods, charities, forums, etc.). Users may interact with content items, such as by following a blog. At 404, a user to item interaction matrix, indicating whether users have interacted with content items, may be generated (e.g., whether a user has watched a movie, whether a user has followed a blog, whether a user has purchased an item, etc.). For example, the user to item interaction matrix may correspond to a follower graph constructed to indicate what users have followed what blogs. The user to item interaction matrix may indicate that if a first user follows a blog that is also followed by a second user, then the first user may also have an interest in other blogs followed by the second user.

Because the user to item interaction matrix may suffer from data sparse issues due to new blogs and/or new users having little to no interaction data (e.g., new blogs with less than a threshold number of followers, new users with less than a threshold number of followed blogs, etc.), content item features and/or user features may be used to supplement the user to item interaction matrix. At 406, a content item description matrix may be generated for a content item (e.g., and/or other content items). The content item description matrix may be populated with one or more content item features about the content item. In an example, an image associated with the content item (e.g., a photo of a soccer ball posted through a blog) may be evaluated to identify an image topic feature as a content item feature for inclusion within the content item matrix (e.g., a deep convolutional neural network may be used to identify categories/topics of the image based upon objects recognized within the image, such as a soccer category, a sports category, etc.). In another example, textual content of the content item (e.g., a user tag for the content item, such as a tag #soccercleats) may be evaluated to identify a textual feature (e.g., a soccer textual feature, a soccer shoes textual feature, etc.) as a content item feature for inclusion within the content item description matrix.

At 408, a user description matrix may be generated for a user (e.g., and/or other users). The user description matrix may be populated with one or more user features about the user. In an example, user identifying information (e.g., the user may provide consent for the use of user identifying information for the purposes of providing recommendations to the user, such as social network posts, consumer good purchase history, movie streaming history, music streaming history, calendar entries, emails, etc.) may be evaluated to identify a user demographic (e.g., age, gender, place of residence, etc.) and/or a user interest of the user (e.g., a social network post may indicate that the user is going to a soccer game, a calendar entry may indicate that the user has soccer practice, etc.). In another example, a user feature may be identified for inclusion within the user description matrix based upon a user content item rating activity (e.g., the user may like a sports blog). In another example, a user feature may be identified for inclusion within the user description matrix based upon a user content item share activity (e.g., the user may reblog a soccer team blog post).

At 410, the user to item interaction matrix, the content item description matrix, and/or the user description matrix may be evaluated to determine whether to recommend the content item, such as the blog about soccer, to the user. In an example of evaluating the matrixes, inductive matrix completion may be performed to jointly factorize the user to item interaction matrix, the content item description matrix, and/or the user description matrix to determine whether to recommend the content item to the user.

In another example of evaluating the matrixes, a meta inductive matrix completion approach may be used where features from different features sources are evaluated and weighted independently to reflect varying degrees of contribution of a feature and/or feature source on whether to recommend the content item to the user (e.g., separate vectors are used for different information sources, such as textual information sources corresponding to user tags or text of blogs, image information sources corresponding to images of blogs, user activity information sources corresponding to users liking or reblogging blogs, etc.). For example, a first feature source (e.g., image topic features of images from blogs), a second feature source (e.g., a user activity feature source, such as user content item rating activities and/or user content item share activities), and/or other feature sources may be identified as corresponding to information sources used to populate the user to item interaction matrix, the content item description matrix, and/or the user description matrix.

A first feature vector may be generated based upon features from the first feature source (e.g., a vector of image topic features), a second feature vector may be generated based upon features from the second feature source (e.g., a vector of user activity features), and/or other feature vectors may be generated. Inductive matrix completion may be performed upon the first feature vector to determine first latent factors of whether to recommend the content item to the user. Inductive matrix completion may be performed upon the second feature vector (e.g., independently of performing the inductive matrix completion upon the first feature vector and/or other feature vectors) to determine second latent factors of whether to recommend the content item to the user. A first contribution weight (e.g., indicating how likely an image topic feature is a good indicator as to whether the user will be interested in the content item) may be applied to the first latent factors to create first weighted latent factors. A second contribution weight may be applied to the second latent factors to create second weighted latent factors. The first weighted latent factors, the second weighted latent factors, and/or other weighted latent factors may be used to determine whether to recommend the content item to the user.

In another example of evaluating the matrixes, a boosted inductive matrix completion approach may be used. For example, matrix completion factorization may be performed on the user to item interaction matrix to generate an approximate matrix (e.g., one or more unknown or empty entries within the user to item interaction matrix may be filled in with approximated values). A residual matrix may be obtained as a difference between the user to item interaction matrix and the approximate matrix. Inductive matrix completion may be performed to factorize the residual matrix, the content item description matrix, and the user description matrix to determine whether to recommend the content item to the user. In this way, the blog regarding soccer may be either recommended or not to the user based upon a likelihood, as determined by the evaluation of the matrixes, of whether the user will find the blog interesting and/or relevant (e.g., a likelihood that the user would follow the blog). At 412, the method 400 ends.

Figure 5:
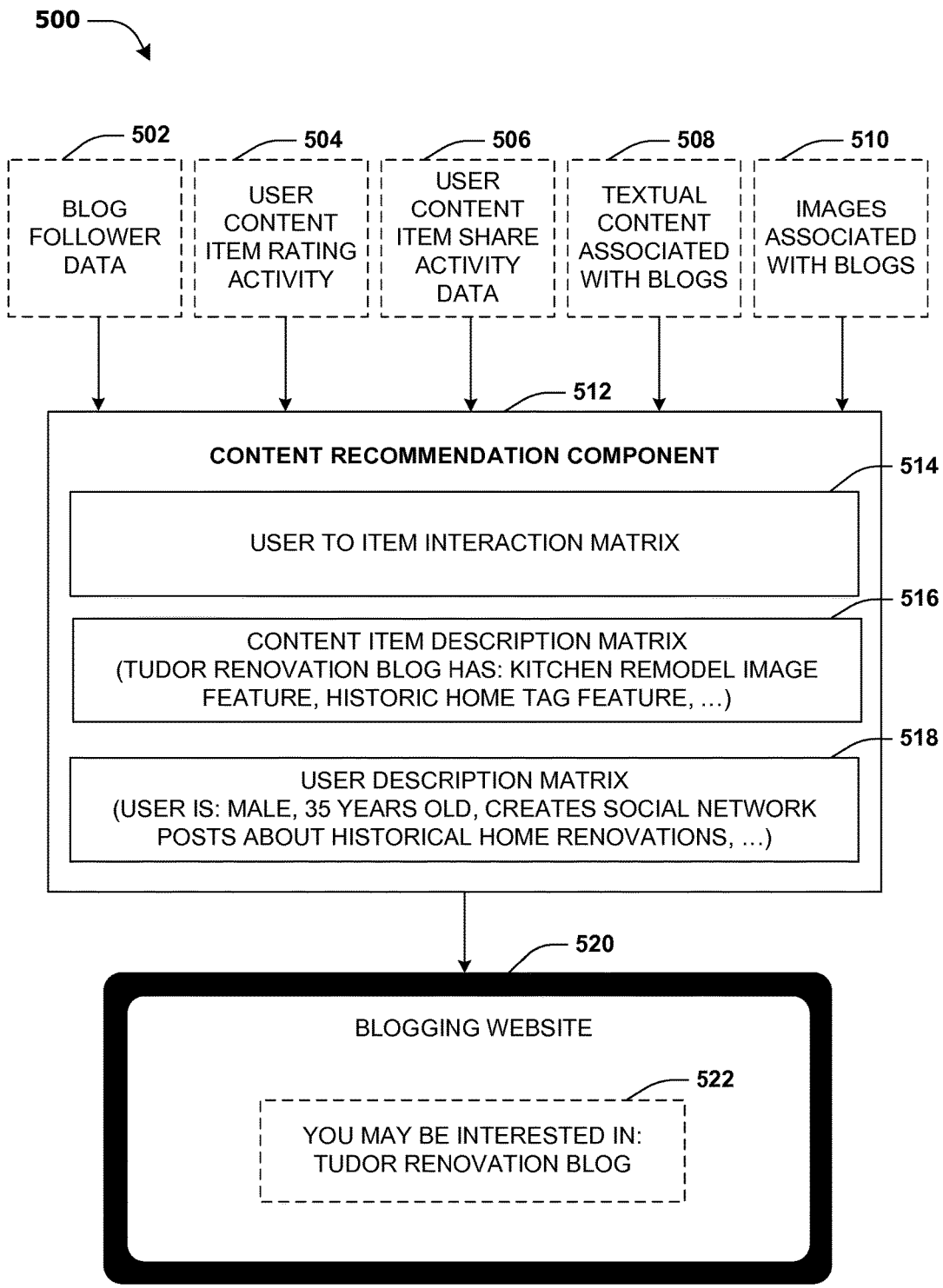
FIG. 5 is a component block diagram illustrating an example system for recommending a content item to a user using inductive matrix completion.

FIG. 5 illustrates an example of a system 500, comprising a content recommendation component 512, for recommending content items to users based upon inductive matrix completion. The content recommendation component 512 may be configured to generate a user to item interaction matrix 514 indicating whether users have interacted with content items, such as blogs or any other type of content items (e.g., watching movies, listening to music, playing videogames, purchasing consumer goods, etc.), based upon blog follower data 502. For example, the user to item interaction matrix 514 may comprise rows, representing users, and columns representing blogs, where a first value (e.g., "1") may indicate that a user interacted with a blog (e.g., followed the blog) and a second value (e.g., "0") may indicate that the user has not yet interacted with the blog. In an example, the user to item interaction matrix 514 may be represented as a follower graph where user nodes represent users, blog nodes represent blogs, and edges between user nodes and blog nodes represent user interactions.

The content recommendation component 512 may generate a content item description matrix 516 for a content item, such as a Tudor renovation blog, and/or other content items. The content recommendation component 512 may populate the content item description matrix 516 with one or more content item features about the content item. For example, the content recommendation component 512 may evaluate textual content 508 of blogs to identify textual features from text, tags, metadata, and/or other textual information of the blogs as content item features for inclusion within the content item description matrix 516. For example, a historic home content item feature may be derived from a historic home tag (e.g., #historichome) of the Tudor renovation blog. The content recommendation component 512 may evaluate images 510 associated with blogs to identify image topic features of the blogs as content item features for inclusion within the content item description matrix 516 (e.g., a deep convolutional neural network may be used to identify categories/topics of an image of a blog based upon objects recognized within the image). For example, a kitchen remodel content item feature may be derived from a kitchen remodel topic identified from an image, depicting a kitchen renovation scene, of the blog.

The content recommendation component 512 may generate a user description matrix 518 for a user, such as user (A) associated with a user device 520, and/or other users. The content recommendation component 512 may populate the user description matrix 518 with one or more user features about the user. For example, the content recommendation component 512 may evaluate user content item rating activity 504 of the user (A) to identify content that the user (A) found interesting and/or relevant (e.g., the user may have liked blogs and/or social network posts about historical landmarks and buildings). The content recommendation component 512 may evaluate user content item share activity data 506 to identify content that the user (A) shared with other users (e.g., the user (A) may have shared movies, blogs, and/or images of Tudor homes). The content recommendation component 512 may evaluate user identifying information (e.g., a user social network profile, user purchase activities, user emails, user calendar entries, locations visited by the user, and/or a variety of information for which the user (A) has given consent for accessing such as for the purpose of content item recommendation) to identify user demographics (e.g., user (A) may be a 35 year old male) and/or user interests of the user (A) (e.g., user (A) may have an interest in historical home renovations based upon the user (A) creating social network posts about historical home renovations).

The content recommendation component 512 may perform inductive matrix completion to jointly factorize the user to item interaction matrix 514, the content item description matrix 516, and the user description matrix 518 to determine whether to recommend the content item, such as the Tudor renovation blog, to the user (A). For example, the joint factorization of the matrixes by inductive matrix completion may indicate that the user (A) has a threshold probability of following the Tudor renovation blog. Accordingly, the content recommendation component 512 may provide a recommendation 522 of the Tudor renovation blog to the user (A) such as through a blogging website, an email, a mobile alert on the user device 520, etc.

Figure 6:
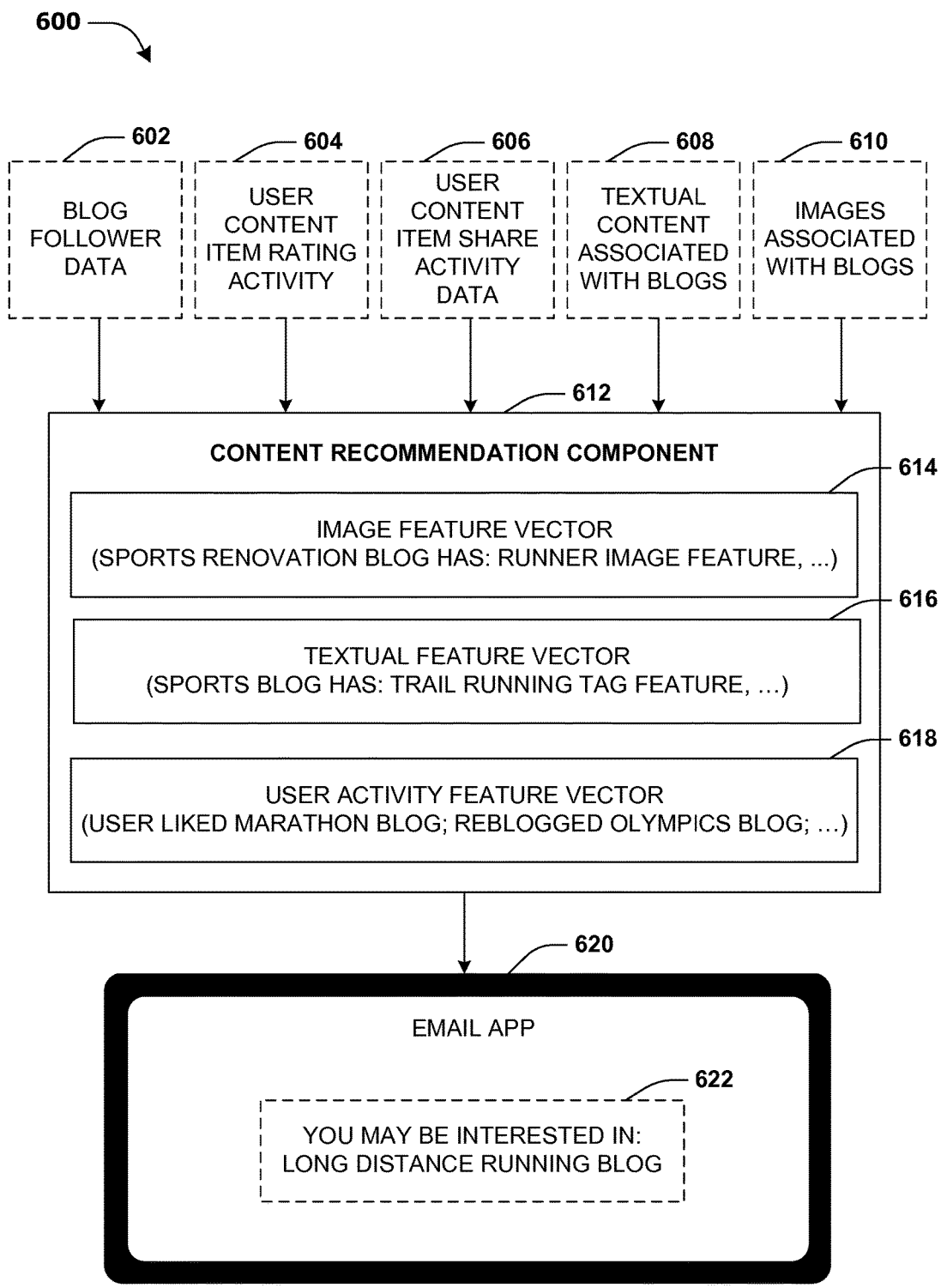
FIG. 6 is a component block diagram illustrating an example system for recommending a content item to a user using meta inductive matrix completion.

FIG. 6 illustrates an example of a system 600, comprising a content recommendation component 612, for recommending content items to users based upon meta inductive matrix completion. The content recommendation component 612 may be configured to generate a user to item interaction matrix indicating whether users have interacted with content items, such as blogs or any other type of content items, based upon blog follower data 602. The content recommendation component 612 may generate a content item description matrix for a content item, such as a long distance running blog, and/or other content items. The content recommendation component 612 may populate the content item description matrix with one or more content item features about the content item, such as a runner image feature, a trail running tag feature (e.g., #trailrunner), and/or other textual features and/or image topic features derived from textual content 608 and/or images 610 of blogs. The content recommendation component 612 may generate a user description matrix for a user, such as user (B) associated with a user device 620, and/or other users. The content recommendation component 612 may populate the user description matrix with one or more user features about the user, such as a marathon blog user like activity, an Olympics blog user reblog activity, and/or other user demographics and/or user interests derived from user identifying information, user content item rating activity data 604, and/or user content item share activity data 606.

The content recommendation component 612 may identify feature sources of features used to generate the user to item interaction matrix, the content item description matrix, and/or the user description matrix, such as an image feature source (e.g., the images 610), a textual feature source (e.g., the textual content 608), a user activity feature source (e.g., the user content item rating activity data 604 and the user content item share activity data 606), etc. The content recommendation component 612 may generate an image feature vector 614 populated with image features from the image feature source, such as the runner image feature. The content recommendation component 612 may generate a textual feature vector 616 populated with textual features from the textual feature source, such as the trail running tag feature. The content recommendation component 612 may generate a user activity feature vector 618 populated with user activity features from the user activity feature source, such as the marathon blog user like activity and the Olympics blog user reblog activity.

The content recommendation component 612 may perform inductive matrix completion upon the individual feature vectors to determine latent factors of whether to recommend the content item, such as the long distance running blog, to the user (B). For example, inductive matrix completion may be performed upon the image feature vector 614 to identify first latent factors. Inductive matrix completion may be performed upon the textual feature vector 616 to identify second latent factors. Inductive matrix completion may be performed upon the user activity feature vector 618 to identify third latent factors. Contribution weights may be applied to the latent factors to create weighted latent factors (e.g., a user activity feature may be weighted higher than an image feature because the user activity feature may be more indicative of whether the user will follow the long distance running blog or not) that are used to determine whether to recommend the long distance running blog. For example, the weighted latent factors may indicate that the user (B) has a threshold probability of following the long distance running blog. Accordingly, the content recommendation component 612 may provide a recommendation 622 of the long distance running blog to the user (B) such as through a blogging website, an email, a mobile alert on the user device 620, etc.

Figure 7:
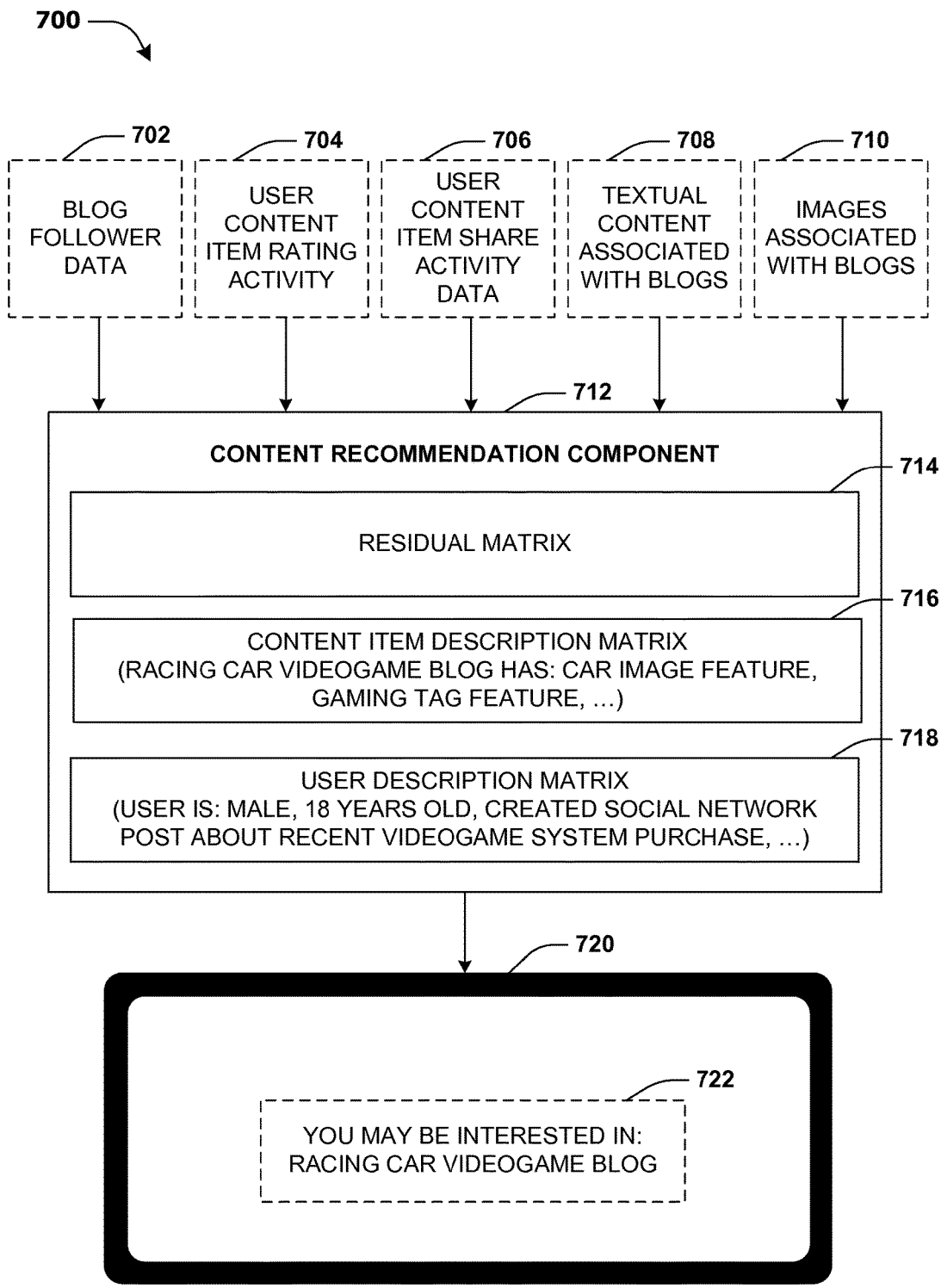
FIG. 7 is a component block diagram illustrating an example system for recommending a content item to a user using boosted inductive matrix completion.

FIG. 7 illustrates an example of a system 700, comprising a content recommendation component 712, for recommending content items to users based upon boosted inductive matrix completion. The content recommendation component 712 may be configured to generate a user to item interaction matrix indicating whether users have interacted with content items, such as blogs or any other type of content item, based upon blog follower data 702. The content recommendation component 712 may perform matrix completion factorization on the user to item interaction matrix to generate an approximate matrix. In an example, the matrix completion factorization may fill in one or more unknown or empty entries, within the user to item interaction matrix, with approximated values to generate the approximate matrix. A residual matrix 714 may be obtained as a difference between the user to item interaction matrix and the approximate matrix.

The content recommendation component 712 may generate a content item description matrix 716 for a content item, such as a racing car videogame blog, and/or other content items. The content recommendation component 712 may populate the content item description matrix 716 with one or more content item features about the content item. For example, the content recommendation component 712 may evaluate textual content 708 of blogs to identify textual features from text, user tags, metadata, and/or other textual information of the blogs as content item features for inclusion within the content item description matrix 716. For example, a gaming content item feature may be derived from a gaming tag of the racing car videogame blog (e.g., #gaming). The content recommendation component 712 may evaluate images 710 associated with blogs to identify image topic features of the blogs as content item features for inclusion within the content item description matrix 716 (e.g., a deep convolutional neural network may be used to identify categories/topics of an image of a blog based upon objects recognized within the image). For example, a car image content item feature may be derived from a car topic identified from an image, depicting a sports car, of the blog.

The content recommendation component 712 may generate a user description matrix 718 for a user, such as user (C) associated with a user device 720, and/or other users. The content recommendation component 712 may populate the user description matrix 718 with one or more user features about the user. For example, the content recommendation component 712 may evaluate user content item rating activity 704 of the user (C) to identify content that the user (C) found interesting and/or relevant (e.g., the user may have liked blogs and/or social network posts about a new videogame system). The content recommendation component 712 may evaluate user content item share activity data 706 to identify content that the user (C) shared with other users (e.g., the user (C) may have shared movies, blogs, and/or images of racing videogames). The content recommendation component 712 may evaluate user identifying information (e.g., a user social network profile, user purchase activities, user emails, user calendar entries, locations visited by the user, and/or a variety of information for which the user (C) has given consent for accessing such as for the purpose of content item recommendation) to identify user demographics (e.g., user (C) may be an 18 year old male) and/or user interests of the user (C) (e.g., user (C) may have an interest in videogames based upon the user (C) creating social network posts about a recent videogame system purchase).

The content recommendation component 712 may perform inductive matrix completion to factorize the residual matrix 714, the content item description matrix 716, and the user description matrix 718 to determine whether to recommend the content item, such as the racing car videogame blog, to the user (C). For example, the factorization of the matrixes by inductive matrix completion may indicate that the user (C) has a threshold probability of following the racing car videogame blog. Accordingly, the content recommendation component 712 may provide a recommendation 722 of the racing car videogame blog to the user (C) such as through a blogging website, an email, a mobile alert on the user device 720, etc.

Figure 8:
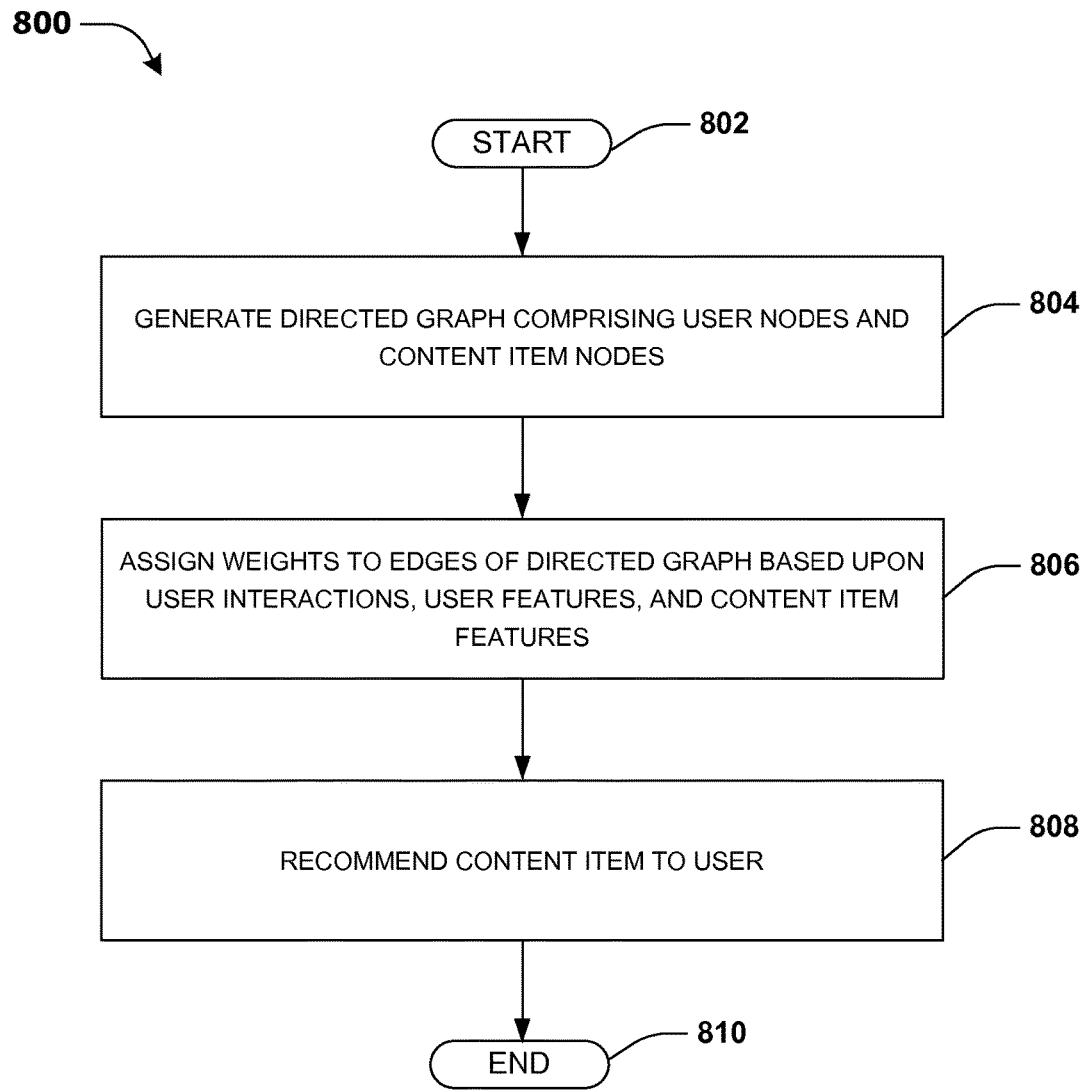
FIG. 8 is a flow chart illustrating an example method of recommending a content item to a user utilizing graph proximity.

An embodiment of recommending a content item to a user utilizing graph proximity is illustrated by an example method 800 of FIG. 8. At 802, the method 800 starts. At 804, a direct graph comprising user nodes, representing users, and content item nodes, representing content items, may be generated. At 806, weights may be assigned to edges connecting user nodes and content item nodes based upon user interactions with content items, user features of users, and/or content item features of content items. For example, an edge connecting a user node, of a user having an interest in sports cars, with a content item node, of a content item having textual and/or image features relating to sports cars, may be assigned a relatively higher weight than a second edge connecting the content item node to a second user node representing an 8 year old girl. Thus, a weight may be indicative of a likelihood a user may be interested in a content item. At 808, responsive to the weight of the edge, connecting the user node to the content item node, exceeding a recommendation threshold, a recommendation of the content item may be provided to the user. At 810, the method 800 ends.

Figure 9:
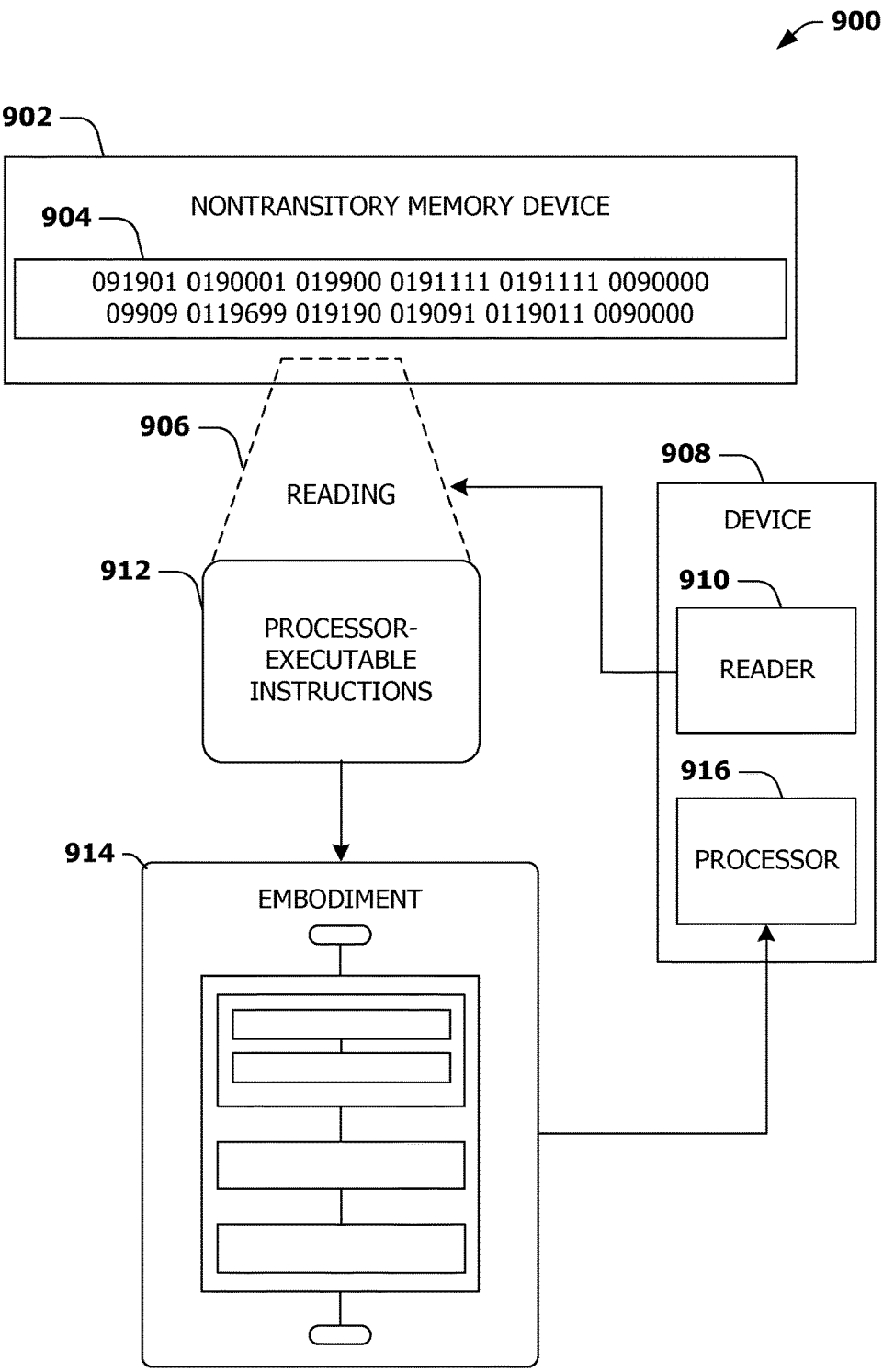
FIG. 9 is an illustration of a scenario featuring an example nontransitory memory device in accordance with one or more of the provisions set forth herein.

FIG. 9 is an illustration of a scenario 900 involving an example nontransitory memory device 902. The nontransitory memory device 902 may comprise instructions that when executed perform at least some of the provisions herein. The nontransitory memory device may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD, DVD, or floppy disk). The example nontransitory memory device 902 stores computer-readable data 904 that, when subjected to reading 906 by a reader 910 of a device 908 (e.g., a read head of a hard disk drive, or a read operation invoked on a solid-state storage device), express processor-executable instructions 912. In some embodiments, the processor-executable instructions, when executed on a processor 916 of the device 908, are configured to perform a method, such as at least some of the example method 400 of FIG. 4 and/or at least some of the example 800 of FIG. 8, for example. In some embodiments, the processor-executable instructions, when executed on the processor 916 of the device 908, are configured to implement a system, such as at least some of the example system 500 of FIG. 5, at least some of the example system 600 of FIG. 6, and/or at least some of the example system 700 of FIG. 7, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for recommending a content item to a user, comprising:

generating, by a processor, a user to item interaction matrix indicating whether users have interacted with content items;

evaluating, by the processor, an image associated with a content item to recognize an object within the image;

identifying, by the processor, an image topic feature based upon the object;

generating, by the processor, a content item description matrix for the content item, the content item description matrix populated with one or more content item features, including the image topic feature, about the content item;

generating, by the processor, a user description matrix for a user, the user description matrix populated with one or more user features about the user, the one or more user features determined based upon an evaluation of geographic locations visited by the user and at least one of social network posts of the user, a consumer good purchase history of the user, a music streaming history of the user, calendar entries of the user or emails of the user;

evaluating, by the processor, the user to item interaction matrix, the content item description matrix, and the user description matrix to determine whether to recommend the content item to the user, wherein the evaluating comprises jointly factorizing the user to item interaction matrix, the content item description matrix, and the user description matrix to determine whether to recommend the content item to the user, the evaluating the user to item interaction matrix, the content item description matrix, and the user description matrix comprising:

identifying a first feature source and a second feature source corresponding to at least one of the user to item interaction matrix, the content item description matrix, or the user description matrix;

generating a first feature vector based upon features from the first feature source;

generating a second feature vector based upon features from the second feature source;

performing inductive matrix completion upon the first feature vector to determine first latent factors of whether to recommend the content item to the user; and performing inductive matrix completion upon the second feature vector to determine second latent factors of whether to recommend the content item to the user, wherein the first feature source comprises image topic features of images from blogs, a first feature of the first feature source comprises a second image topic feature of a second image, the second feature source comprises a user activity feature source, and a second feature of the second feature source comprises a user activity feature comprising at least one of a user content item rating activity or a user content item share activity; and controlling transmission of one or more recommendations to a computing device comprising sending, by the processor, a recommendation of the content item over a computer network to the computing device for rendering on a display of the computing device based upon a result of the joint factorization and refraining from sending, by the processor, a second recommendation of a second content item over the computer network to the computing device.

2. The method of claim 1, the generating the user description matrix comprising identifying the social network posts of the user, evaluating the social network posts of the user to identify at least one of a first demographic of the user or a first interest of the user, and populating the user description matrix for the user based upon at least one of the first demographic or the first interest.

3. The method of claim 1, the generating the user description matrix comprising identifying the consumer good purchase history of the user, evaluating the consumer good purchase history of the user to identify at least one of a first demographic of the user or a first interest of the user, and populating the user description matrix for the user based upon at least one of the first demographic or the first interest.

4. The method of claim 1, the generating the user description matrix comprising identifying the music streaming history of the user, evaluating the music streaming history of the user to identify at least one of a first demographic of the user or a first interest of the user, and populating the user description matrix for the user based upon at least one of the first demographic or the first interest.

5. The method of claim 1, the generating the user description matrix comprising identifying the calendar entries of the user, evaluating the calendar entries of the user to identify at least one of a first demographic of the user or a first interest of the user, and populating the user description matrix for the user based upon at least one of the first demographic or the first interest.

6. The method of claim 1, the generating the user description matrix comprising identifying the emails of the user, evaluating the emails of the user to identify at least one of a first demographic of the user or a first interest of the user, and populating the user description matrix for the user based upon at least one of the first demographic or the first interest.

7. The method of claim 1, the generating a user description matrix comprising:
identify a user feature for inclusion within the user description matrix based upon at least one user content item share activity.

8. The method of claim 1, the evaluating the user to item interaction matrix, the content item description matrix, and the user description matrix comprising:
performing inductive matrix completion to jointly factorize the user to item interaction matrix, the content item description matrix, and the user description matrix to determine whether to recommend the content item to the user.

9. The method of claim 1, the one or more user features determined based upon the social network posts of the user.

10. The method of claim 1, the one or more user features determined based upon the calendar entries of the user.

11. The method of claim 1, the one or more user features determined based upon the emails of the user.

12. The method of claim 1,
the evaluating the user to item interaction matrix, the content item description matrix, and the user description matrix comprising:
performing matrix completion factorization on the user to item interaction matrix to obtain a residual matrix; and
performing inductive matrix completion to factorize the residual matrix, the content item description matrix, and the user description matrix to determine whether to recommend the content item to the user; and
the performing matrix completion factorization comprising:
performing matrix completion factorization on the user to item interaction matrix to generate an approximate matrix; and
obtaining the residual matrix as a difference between the user to item interaction matrix and the approximate matrix.

13. The method of claim 1, the content item corresponding to a blog.

14. The method of claim 13, the blog comprising a new blog with less than a threshold number of followers.

15. The method of claim 12, the user comprising a new user with less than a threshold number of followed blogs.

16. A system for recommending a content item to a user, comprising:
a content recommendation component, executed by a processor using instructions stored in memory, configured to:
generate a user to item interaction matrix indicating whether users have interacted with content items;
evaluate an image associated with a content item to recognize an object within the image;
identify an image topic feature based upon the object;
generate a content item description matrix for the content item, the content item description matrix populated with one or more content item features, including the image topic feature, about the content item;
generate a user description matrix for a user, the user description matrix populated with one or more user features about the user, the one or more user features determined based upon an evaluation of geographic locations visited by the user and at least one of social network posts of the user, a consumer good purchase history of the user, a music streaming history of the user, calendar entries of the user or emails of the user;
evaluate the user to item interaction matrix, the content item description matrix, and the user description matrix by jointly factorizing the user to item interaction matrix, the content item description matrix, and the user description matrix to determine whether to recommend the content item to the user, the evaluating the user to item interaction matrix, the content item description matrix, and the user description matrix comprising:

identifying a first feature source and a second feature source corresponding to at least one of the user to item interaction matrix, the content item description matrix, or the user description matrix;

generating a first feature vector based upon features from the first feature source;

generating a second feature vector based upon features from the second feature source;

performing inductive matrix completion upon the first feature vector to determine first latent factors of whether to recommend the content item to the user; and performing inductive matrix completion upon the second feature vector to determine second latent factors of whether to recommend the content item to the user, wherein the first feature source comprises image topic features of images from blogs, a first feature of the first feature source comprises a second image topic feature of a second image, the second feature source comprises a user activity feature source, and a second feature of the second feature source comprises a user activity feature comprising at least one of a user content item rating activity or a user content item share activity; and selectively send or refrain from sending a recommendation over a computing network to a computing device for rendering on a display of the computing device based upon a result of the joint factorization.

17. The system of claim 16, the content recommendation component configured to:

perform inductive matrix completion to jointly factorize the user to item interaction matrix, the content item description matrix, and the user description matrix to determine whether to recommend the content item to the user.

18. The system of claim 16, the one or more user features determined based upon the emails of the user.

19. The system of claim 16, the content recommendation component configured to:

perform matrix completion factorization on the user to item interaction matrix to generate an approximate matrix;

obtain a residual matrix as a difference between the user to item interaction matrix and the approximate matrix; and perform inductive matrix completion to factorize the residual matrix, the content item description matrix, and the user description matrix to determine whether to recommend the content item to the user.

20. A non-transitory machine readable medium having stored thereon processor-executable instructions that when executed cause performance of operations, the operations comprising:

generating a user to item interaction matrix indicating whether users have interacted with content items;

evaluating an image associated with a content item to recognize an object within the image;

identifying an image topic feature based upon the object;

generating a content item description matrix for the content item, the content item description matrix populated with one or more content item features, including the image topic feature, about the content item;

generating a user description matrix for a user, the user description matrix populated with one or more user features about the user, the one or more user features determined based upon an evaluation of geographic locations visited by the user and at least one of social network posts of the user, a consumer good purchase history of the user, a music streaming history of the user, calendar entries of the user or emails of the user;

evaluating the user to item interaction matrix, the content item description matrix, and the user description matrix to determine whether to recommend the content item to the user, wherein the evaluating comprises jointly factorizing the user to item interaction matrix, the content item description matrix, and the user description matrix to determine whether to recommend the content item to the user, the evaluating the user to item interaction matrix, the content item description matrix, and the user description matrix comprising:

identifying a first feature source and a second feature source corresponding to at least one of the user to item interaction matrix, the content item description matrix, or the user description matrix;

generating a first feature vector based upon features from the first feature source;

generating a second feature vector based upon features from the second feature source;

performing inductive matrix completion upon the first feature vector to determine first latent factors of whether to recommend the content item to the user; and performing inductive matrix completion upon the second feature vector to determine second latent factors of whether to recommend the content item to the user, wherein the first feature source comprises image topic features of images from blogs, a first feature of the first feature source comprises a second image topic feature of a second image, the second feature source comprises a user activity feature source, and a second feature of the second feature source comprises a user activity feature comprising at least one of a user content item rating activity or a user content item share activity; and selectively sending or refraining from sending a recommendation over a computing network to a computing device for rendering on a display of the computing device based upon a result of the joint factorization.

* * * * *